350-96.27 SR
XR 3,609,233

United States Patent

[11] 3,609,233

[72] Inventor Kazuyoshi Nagao
Yokohama, Japan

[21] Appl. No. 861,848
[22] Filed Sept. 29, 1969
[45] Patented Sept. 28, 1971
[73] Assignee American Optical Corporation
Southbridge, Mass.

[54] ELECTRON TUBE FACSIMILE APPARATUS
5 Claims, 3 Drawing Figs.

[52] U.S. Cl. .......... 178/7.2, 178/DIG. 2, 313/89, 350/96 B
[51] Int. Cl. .......... H04n 1/00
[50] Field of Search .......... 178/7.2, 7.2 E, 7.1, 6; 313/89; 350/96 B; 250/219 FR, 219 DQ, 219 ID

[56] References Cited
UNITED STATES PATENTS

| | | | |
|---|---|---|---|
| 1,760,866 | 6/1930 | Belin | 178/7.1 R |
| 1,897,219 | 2/1933 | Schroter | 178/7.1 R |
| 3,198,881 | 8/1965 | Knocklein | 178/6 |
| 3,467,774 | 9/1964 | Bryant | 178/6 |
| 3,470,319 | 9/1969 | McGlamery | 178/6 |

*Primary Examiner*—Robert L. Griffin
*Assistant Examiner*—Richard P. Lange
*Attorneys*—William C. Nealon, Noble S. Williams and Robert J. Bird

ABSTRACT: A cathode-ray tube is provided with a light-transmitting face comprised of a rectangular strip of optical fibers having a long and narrow light-emitting end across which a manuscript is moved for photoelectrically copying subject matter thereon. A flying spot of light produced within the tube is transmitted through the strip of fibers onto the manuscript and portions of this light reflected from the manuscript are received by a prism-lens system adjacent the emitting end of the strip of fibers. This system then directs the reflected light onto a photoelectric transducer for conversion into an electrical signal which is useful as an electrical reading of the manuscript or convertible into other forms of facsimile information.

3609233
NO OR CLASSIF

INVENTOR
KAZUYOSHI NAGAO
BY [signature]
ATTORNEY

ELECTRON TUBE FACSIMILE APPARATUS

BACKGROUND OF THE INVENTION

1. Field of the Invention

Electron tube facsimile apparatus with particular reference to improvements in a fiber optical photoelectric image-transducing system.

2. Description of the Prior Art

Facsimile apparatuses used for electro-optically reading and/or producing copies of semitransparent and opaque manuscripts have heretofore involved the use of manuscript illuminating and scanning systems involving relatively intricate and complex equipment requiring frequent maintenance and having the additional inconvenience of slow-reading and/or image-copying speeds mainly due to their limited light-transmitting capabilities.

Accordingly, it is a principal object of the present invention to enhance the resolution and/or definition of facsimile information along with an increase in scanning rates through the provision of an improved light-transmitting and transducing manuscript-scanning system employing a cathode-ray tube flying spot of light as the source of illumination in the system.

SUMMARY OF THE INVENTION

According to the present invention, a cathode-ray tube is provided with a light-transmitting face formed of a rectangular strip of juxtaposed optical fibers having a long and narrow light-emitting end across which a manuscript or the like is moved, preferable continuously, for producing a photoelectric reading of image information thereon. A beam of electrons within the cathode-ray tube, in becoming incident upon an electroluminous coating adjacent the light-receiving end of the strip of fibers and being caused to scan across the fiber strip, produced a flying spot of light which is transmitted directly through the fibers by total internal reflection and becomes incident upon the manuscript. An elongated light-receiving prism and light-focusing lens element positioned adjacent the light-emitting end of the strip of fibers receives light reflected from the manuscript and directs the same upon a photoelectric transducer. This light is converted into an electrical signal which is modulated according to variations in the instantaneous intensities of the light and constitutes an electrical reading of the manuscript which is useful as such, or convertible into other forms of reading information.

Details of the present invention will be more fully understood by reference to the following description and the accompanying drawing.

DESCRIPTION OF THE PREFERRED EMBODIMENTS

Figure 1:
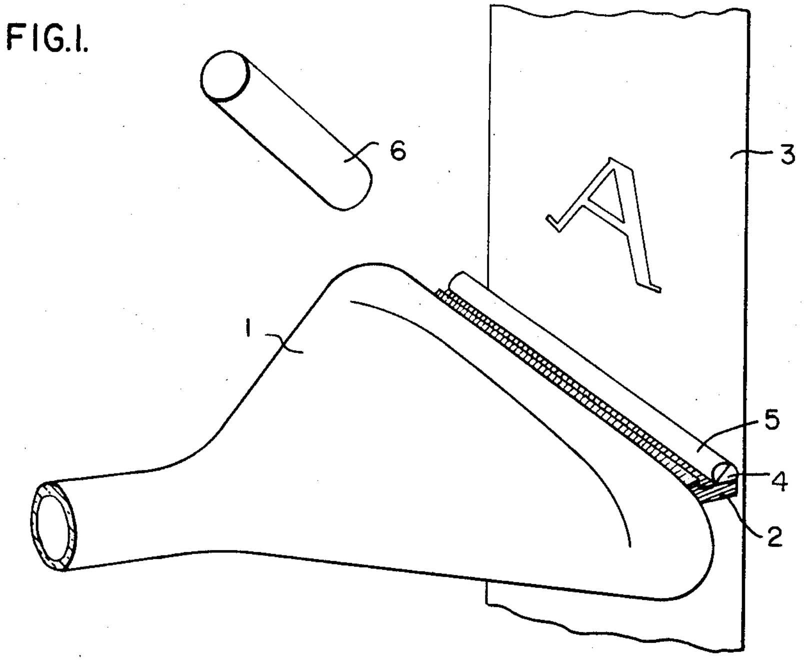
FIG. 1 is a diagrammatic illustration, in perspective, of a preferred embodiment of the invention.

Referring more particularly to the drawings, the apparatus in general comprises a cathode-ray tube 1 having a forwardly extending rectangular strip of optical fibers at its face along the length of which flying spot of light produced within the tube is caused to scan. This light is transmitted through the strip of optical fibers to a emitting face thereof across which a manuscript 3 is moved, preferably continuously, and thus illuminated by the cathode-ray tube 1.

An elongated prism 4 is positioned so as to extend over the full length of one side of the strip of optical fibers adjacent the light-emitting end thereof. The prism 4 receives light reflected from manuscript 3 and directs the same into lens 5 which extends over the full length of the prism. Lens 5, in turn, focuses the light received thereby onto a photoelectric transducer 6 (e.g. a photomultiplier).

A transparent spacer 7 (illustrated only in FIG. 2) is preferably positioned between the forward face of the strip 2 of optical fibers and manuscript 3 in order to produce a slight gap therebetween with which light incident upon manuscript 3 and reflected therefrom is permitted to reach the light-receiving face of prism 4. Spacer 7 may be in the form of a transparent film movable in unison with manuscript 3 or, alternatively, a thickness of transparent material attached to the light-emitting end of the strip of fibers 2.

Figure 2:
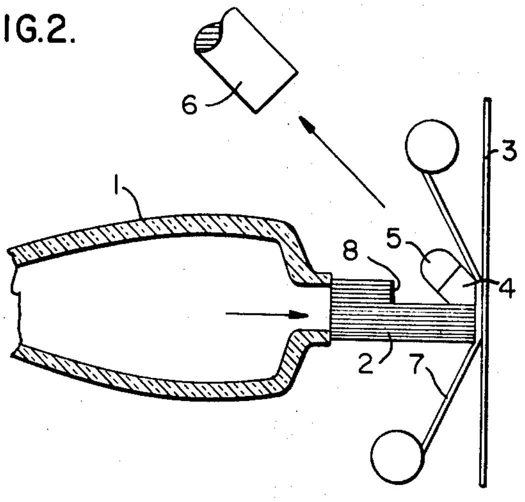
FIG. 2 is a partially cross-sectional side elevational view more clearly illustrating constructional details of the embodiment of the invention shown in FIG. 1.

The strip of optical fibers is stepped down by a vertical cut extending part way therethrough so as to receive prism 4 in the manner illustrated more clearly in FIG. 2. The edge of the cut is provided with a coating or film 8 preventing emission of light from corresponding cut ends of the fibers. The fibers of strip 2 are so arranged that their respective axes are angled slightly from an orthogonal relationship with the front light-emitting ends thereof so that a component of positive reflection of light from manuscript 3 is avoided in cases where the manuscript subject matter to be copied has a glossy surface.

Figure 3:
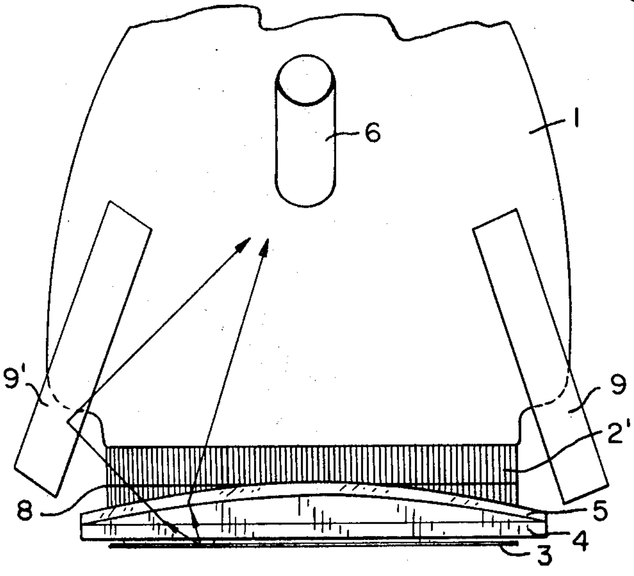
FIG. 3 is a diagrammatic tip plan view of the apparatus shown in FIGS. 1 and 2.

A modification of the invention includes a pair of mirrors, 9,9′ (FIG. 3) so arranged as to pick up portions of reflected light from the manuscript which is do not become refracted by lens 5. Thus, this light is reflected by mirrors 9,9′ into transducer 6.

In operation of illustrated embodiments of the apparatus, manuscript 3 is scanned by movement thereof longitudinally across the light-emitting end of the strip 2 of optical fibers. At the same time, the flying spot of light emitted through the fibers of strip 2 from tube 1 is caused to repeatedly and rapidly move transversely across manuscript 3 along the length of the strip 2 of optical fibers. Portions of this light reflected from the manuscript and becoming incident upon prism 4 and/or mirrors 9,9′ are refracted by lens 5 and/or reflected from mirrors 9,9′ onto transducer 6 which, in turn, converts this light into an electrical signal modulated according to variations in intensities of the light received thereby. Color-analyzed electrical signals may be produced by utilizing, as transducer 6, a unit of three individual photoelectric transducers respectively receiving substantially equal portions of light through red, green and blue band-pass filters.

It is to be understood that the strip of optical fibers 2 may be sealed directly into the face portion of cathode-ray tube 1, or attached to the face of a conventional solid glass cathode-ray tube envelope.

I claim:

1. Electron tube facsimile apparatus comprising a cathode-ray tube having a electroluminous face portion across which a flying spot of light is produced by operation of the tube and a strip of juxtaposed light-conducting fibers extending through the face portion of said tube for receiving and conveying said spot of light outwardly of said tube, said strip having a long and narrow light-emitting outer end across which an article bearing image information to be reproduced is moved whereby light emitted from said outer end of said strip of fibers becomes incident upon and partially reflected by said article in amounts characterized by said image information, and an elongated light-focusing lens and photoelectric transducing means externally of said tube for respectively focusing said reflected light into said transducing means and converting said light into an electrical signal having utility as an electrical reading of said image wherein the improvement comprises:

an elongated light-receiving prism extending along said strip of fibers against one side of said light-emitting end thereof for receiving at least a major portion of light reflected from said article and for directing said reflected light obliquely away from said strip of fibers toward said lens for reception thereby and focusing upon said transducing means.

2. Electron tube facsimile apparatus according to claim 1 further including a transparent spacer means between said light emitting end of said strip of fibers and said article wherewith reflection of said light from said article into said prism is facilitated.

3. Electron tube facsimile apparatus according to claim 1 further including a pair of mirrors, one disposed adjacent each of opposite ends of said light-focusing lens.

4. Electron tube facsimile apparatus according to claim 1 wherein said light-transducing means comprises a plurality of photoelectric devices and a corresponding number of light band-pass filters arranged to filter said light reflected from said article and pass a different relatively narrow band of wavelengths thereof onto each of said photoelectric devices.

5. Electron tube facsimile apparatus according to claim 1 wherein said strip of light-conducting fibers is stepped down intermediately of said prism and cathode-ray tube by a transverse cut through certain fibers thereof and the cut ends of said certain fibers are coated with an opaque material to prevent the transmission of light therethrough.